US006795649B2

(12) United States Patent
Murakami

(10) Patent No.: US 6,795,649 B2
(45) Date of Patent: Sep. 21, 2004

(54) CAMERA, LENS APPARATUS, AND CAMERA SYSTEM

(75) Inventor: Junichi Murakami, Tochigi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/633,999

(22) Filed: Aug. 4, 2003

(65) Prior Publication Data
US 2004/0028400 A1 Feb. 12, 2004

(30) Foreign Application Priority Data
Aug. 6, 2002 (JP) ........................................ 2002-228963

(51) Int. Cl.[7] .............................................. G03B 33/00
(52) U.S. Cl. ...................................... 396/303; 396/532
(58) Field of Search ................................. 396/301, 303, 396/532

(56) References Cited
U.S. PATENT DOCUMENTS
6,144,192 A * 11/2000 Suzuki ........................ 323/222
* cited by examiner Primary Examiner—David M. Gray
(74) Attorney, Agent, or Firm—Morgan & Finnegan, LLP

(57) ABSTRACT

There is disclosed a camera system capable of reducing a time after a lens drive command is output until a lens is driven. A camera system according to the present invention comprises a lens apparatus having a booster circuit for boosting a supply voltage and an actuator for receiving a voltage supply from the booster circuit so as to drive a lens unit, and a camera. A camera controller transmits a booster drive command and a lens drive command to the lens controller. The lens controller drives the booster circuit in response to a reception of the booster drive command, and drives the actuator in response to a reception of the lens drive command.

13 Claims, 5 Drawing Sheets

CAMERA, LENS APPARATUS, AND CAMERA SYSTEM

BACKGROUND OF THE INVENTION

1. Field of the Invention

The present invention relates to a camera having a focus control function, a lens apparatus, and a camera system.

2. Description of the Related Art

Conventionally, there has been widely used a camera system which is configured with a camera and an interchangeable lens attachable to the camera and which has a focus control function.

In such a camera system, the camera has a structure described later. In other words, the camera is provided with a communication unit which makes communication with the interchangeable lens, a photometry circuit which measures the amount of incident light passing through the interchangeable lens, and a focusing circuit which measures a distance up to a subject or detecting a focusing state of the interchangeable lens. Further, there are provided a shutter control circuit which exposes a film or an image-pickup element such as CCD for an appropriate time, a film feeding circuit (in the case of a film camera) which performs winding/rewinding of a film, a release button which is operated in order to start an image-taking operation which performs an image-taking preparation operation such as photometry or focusing and exposure, and a camera controller which controls various operations of the camera.

On the other hand, the interchangeable lens is provided with a communication unit which makes communication with the camera, a lens drive circuit which drives a focus lens, a diaphragm drive circuit which drives a diaphragm, and a lens controller which controls various operations of the lens.

Here, the lens drive circuit is configured to operate in response to a reception of a voltage supply from a power supply provided in the camera. Further, there is an interchangeable lens using a vibration type motor which is employed as a drive source which drives the focus lens. In the case where the vibration type motor is employed, a voltage supplied from the camera side is converted into a voltage required for driving the vibration type motor in a DC/DC converter to be supplied to the vibration type motor.

In the case where image-taking is performed using the camera system having the above structure, this camera system is operated along an image-taking sequence described later.

At first, when a camera operator operates the release button, a photometry operation and a focusing operation (image-taking preparation operation) are performed, and a diaphragm drive amount and a focus lens drive amount are operated on the basis of this photometry result and the focusing result. Then, drive commands of the focus lens and the diaphragm and information indicating these drive amounts are transmitted to the lens controller of the interchangeable lens.

The lens controller drives the diaphragm and the focus lens by the drive amounts according to the received information. Here, in the case where the vibration type motor is employed as the drive source of the focus lens, as shown in FIG. 4(A), after the lens controller receives the focus drive command (DC/DCON), it drives the DC/DC converter at first and boosts an output voltage from the camera to a predetermined voltage level. The camera waits for an operation concerning image-taking during this boosting operation.

Thereafter, the vibration type motor is driven by the drive amount according to the information transmitted from the camera controller. Thereby, the focus lens is moved in an optical axis direction and stopped at an in-focus position. The camera performs an opening/closing operation of the shutter so as to expose a film or an image-pickup element for an appropriate time.

As described above, in the case where the vibration type motor is employed as the drive source of the focus lens, the drive of the focus lens has to be waited for only a predetermined time after the focus drive command from the camera controller is received until the output voltage of the DC/DC converter reaches a sufficient voltage level. Therefore, a time loss for the standby time occurs, which causes a long lens drive time after the operator operates the release button until the focus lens reaches the in-focus position.

SUMMARY OF THE INVENTION

It is an object of the present invention to provide a camera, a lens apparatus, and a camera system capable of reducing a time after a lens drive command is output until a lens is driven.

In order to achieve the above object, a camera system according to one aspect of the present invention comprises a lens apparatus having a booster circuit which boosts a supply voltage, an actuator which receives a voltage supply from the booster circuit so as to drive a lens unit, and a lens controller which controls the drive of the booster circuit and the actuator. Further, the camera system comprises a camera having a communication unit which makes communication with the lens controller and a camera controller which transmits a lens drive command for driving the actuator to the lens controller via the communication unit.

The camera controller also transmits a booster drive command for driving the booster circuit to the lens controller. Further, the lens controller drives the booster circuit in response to a reception of the booster drive command, and drives the actuator in response to a reception of the lens drive command.

The characteristics of the camera, the lens apparatus, and the camera system according to the present invention will be apparent from the following specific description of an embodiment with reference to the drawings.

DETAILED DESCRIPTION OF THE PREFERRED EMBODIMENT

Hereinafter, one embodiment according to the present invention will be described with reference to the drawings.

Figure 1:
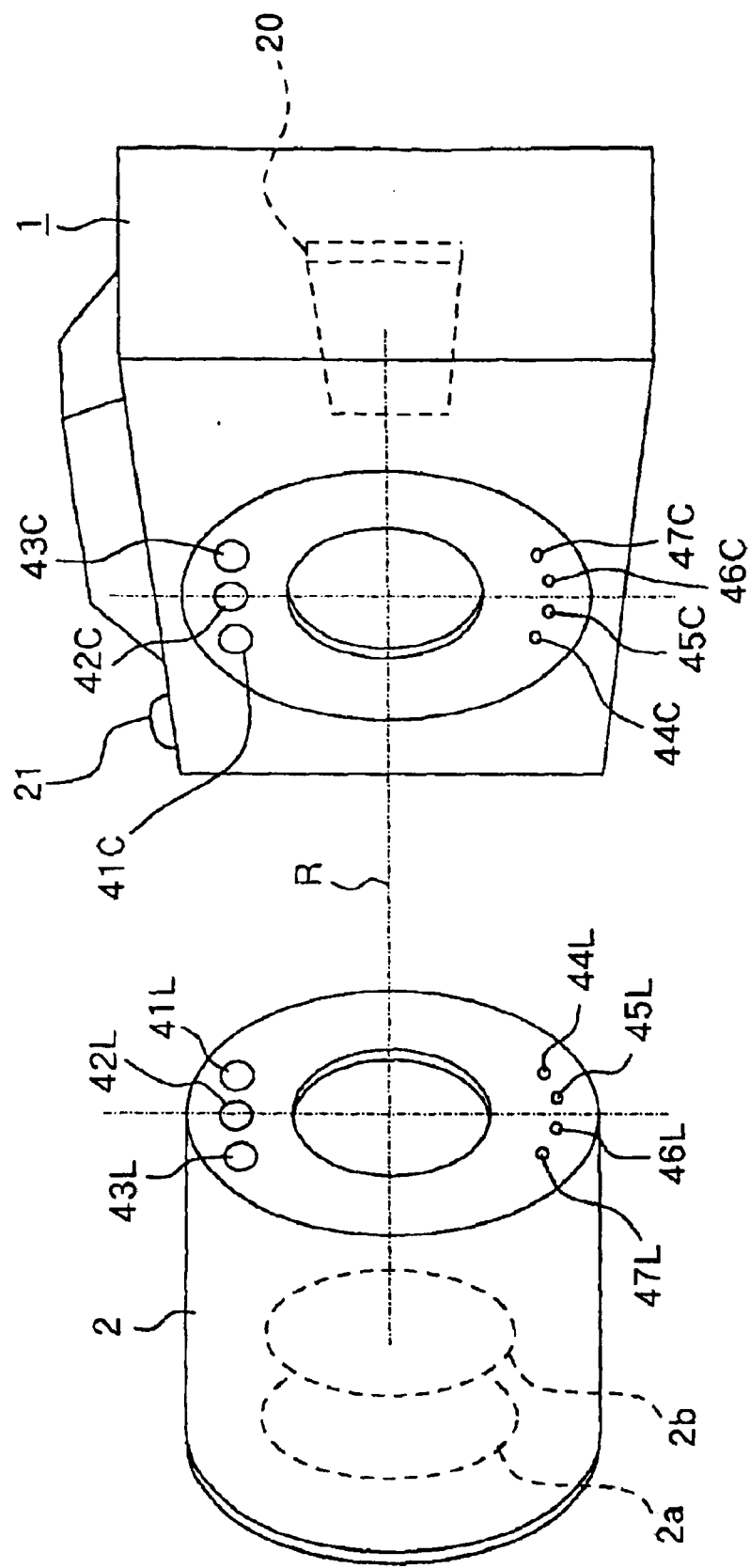
FIG. 1 is an appearance perspective view of a camera system according to one embodiment of the present invention.
Figure 2:
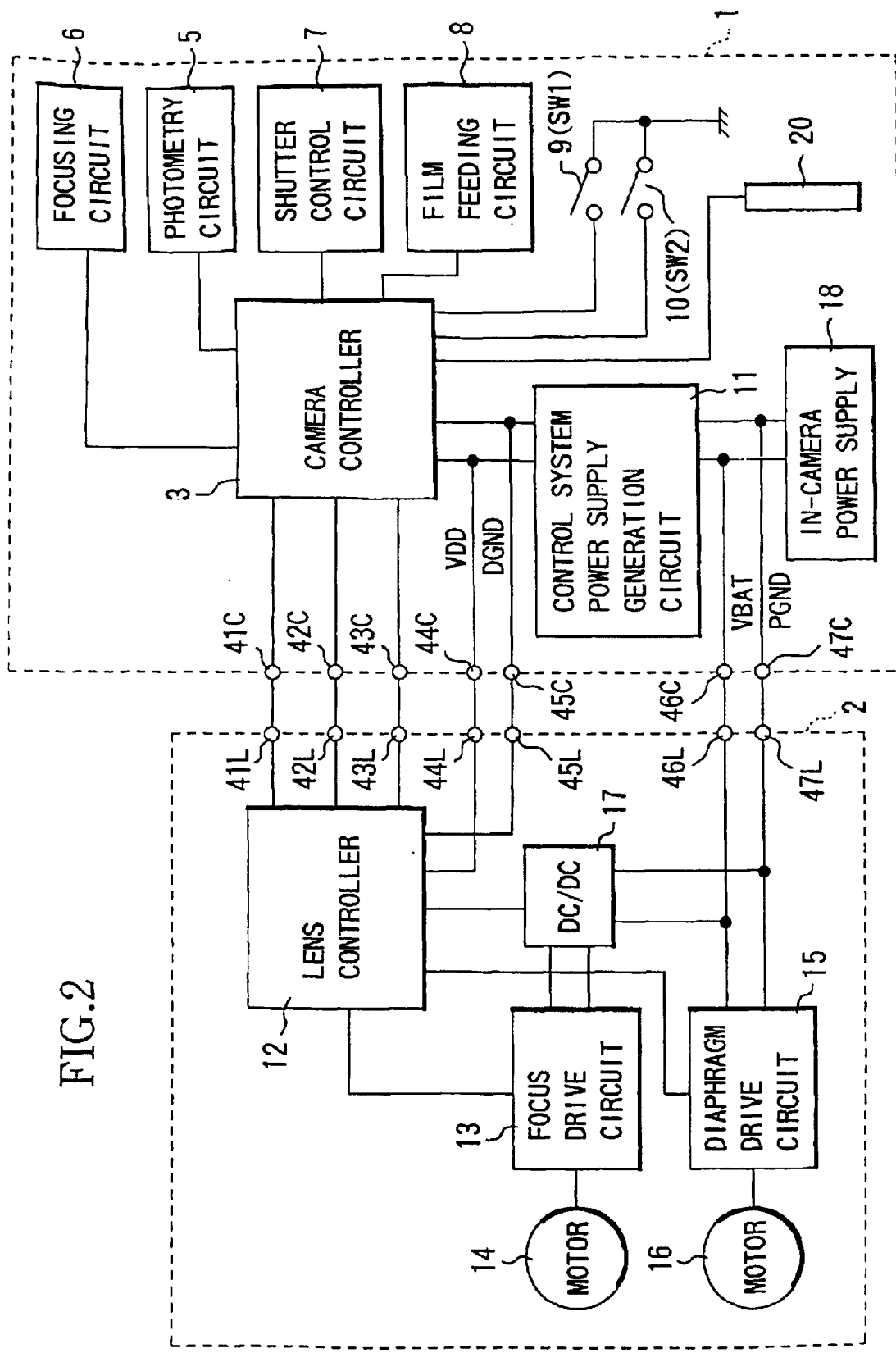
FIG. 2 is a block diagram showing a structure of the camera system according to the embodiment.

FIG. 1 is an appearance perspective view of a camera system according to one embodiment of the present invention, and FIG. 2 is a block diagram showing a structure of the camera system. In FIG. 1 and FIG. 2, numerical reference 1 denotes a camera, and numerical reference 2 denotes an interchangeable lens (lens apparatus) attachable to/detachable from the camera 1. The camera 1 and the interchangeable lens 2 are connected to each other through a mount structure having electric contacts as shown in FIG. 1.

In FIG. 2, numerical reference 3 denotes a camera controller provided in the camera 1, which is configured with a CPU, a MPU, or the like. The camera controller 3 performs various sequence processings in the camera 1, and further transmits predetermined commands to the interchangeable lens 2 (lens controller 12) via electric contacts 41C to 43C at the camera side and electric contacts 41L to 43L at the lens side or performs transmitting/receiving of predetermined data.

Numerical reference 5 denotes a photometry circuit, which measures the amount of incident light through lens units 2a and 2b (numerical reference 2a denotes a variable power lens unit and numerical reference 2b denotes a focus lens unit) configuring an image-taking optical system arranged in the interchangeable lens 2 in response to a command from the camera controller 3 and transmits this photometry result to the camera controller 3. The camera controller 3 performs operation of an exposure value on the basis of the photometry result.

Numerical reference 6 denotes a focusing circuit, which measures a subject distance in response to a command from the camera controller 3 or detects a focusing state in the image-taking optical system to transmit the result thereof to the camera controller 3. The camera controller 3 calculates a drive direction and a drive amount of the focus lens unit 2b on the basis of the above result.

Numerical reference 7 denotes a shutter control circuit, which opens/closes a shutter unit (not shown) in response to a command from the camera controller 3. Thereby, an exposure to an image-pickup element (photoelectric conversion element) 20 such as CCD or CMOS sensor arranged in the camera 1 or a film (not shown) is performed. In addition, when the present camera 1 is a film camera which performs an exposure to a film, there is provided a film feeding circuit 8 for performing winding/rewinding of a film in response to a command from the camera controller 3.

Numerical reference 9 denotes an image-taking preparation start switch (SW1), and an image-taking preparation operation such as photometry operation or focusing operation is started in response to the ON state of this image-taking preparation start switch 9. Numerical reference 10 denotes an image-taking switch (SW2), and an exposure operation is started when this image-taking switch 10 enters the ON state.

Here, as shown in FIG. 1, a release button 21 which is an operation member having a two-step stroke is provided in the camera 1. When this release button 21 is operated in a half-pressed manner (first stroke), the SW1 enters the ON state, and when it is operated in a full-pressed manner (second stroke), the SW2 enters the ON state.

The camera controller 3 performs operation of an exposure value in response to the ON state of the SW1 or detects a focusing state of the image-taking optical system (alternatively measures a distance up to a subject), and transmits a focus drive command (lens drive command), a diaphragm drive command, and the like to the lens controller 12 in the interchangeable lens 2 via the electric contacts 41C to 43C and 41L to 43L in order to cause the interchangeable lens 2 to perform a focus adjusting operation and a diaphragm operation.

Further, in order to know data on an operation state (zoom position, focus position, diaphragm value, and the like) of the interchangeable lens 2 or lens data (open diaphragm value, focal length, data required for focusing operation) on the interchangeable lens 2 as needed, the camera controller 3 transmits a request of transmitting these items of data to the lens controller 12.

Numerical reference 18 denotes an in-camera power supply (battery) provided in the camera 1. A voltage (indicated as VBAT, PGND in FIG. 2) of the in-camera power supply 18 is transmitted to a control system power supply generation circuit 11. The control system power supply generation circuit 11 generates a voltage (indicated as VDD, DGND in FIG. 2) for operating an electric circuit in the camera system.

The voltage (VDD, DGND) generated in the control system power supply generation circuit 11 is sent to the lens controller 12 via electric contacts 44C and 45C at the camera side and electric contacts 44L and 45L at the lens side. This voltage is used as a drive voltage of the electric circuit in the interchangeable lens 2. Further, the voltage in the in-camera power supply 18 is sent to a focus drive circuit 13 and a diaphragm drive circuit 15 in the interchangeable lens 2 via electric contacts 46C and 47C at the camera side and electric contacts 46L and 47L at the lens side.

The lens controller 12 controls various operations in the interchangeable lens 2, and receives various commands or data transmitted from the camera controller 3 and performs processings according to these commands.

For example, when the lens controller 12 receives a focus drive command from the camera controller 3, it drives a focus drive motor 14 which is an actuator via the focus drive circuit 13 so as to move the focus lens unit 2b in an optical axis direction. The focus drive command includes information on a drive direction and a drive amount of the focus lens unit 2b in order to obtain in-focus state operated by the camera controller 3 so that an in-focus state can be obtained when the lens controller 12 drives the focus lens unit 2b on the basis of these items of information.

Further, when the lens controller 12 receives a diaphragm drive command from the camera controller 3, it drives the diaphragm drive motor 16 through the diaphragm drive circuit 15 so as to operate a diaphragm unit (not shown). Further, the lens controller 12 transmits the data on the operation state (zoom position, focus position, diaphragm value, and the like) of the interchangeable lens 2 or the lens data (open diaphragm value, focal length, data required for focusing operation) on the interchangeable lens 2 in response to a request from the camera 1.

The focus drive circuit 13 drives the focus drive motor 14 which is a vibration type motor in response to a command from the lens controller 12 so as to move the focus lens unit 2b in an optical axis direction. The diaphragm drive circuit 15 drives the diaphragm drive motor 16 in response to a command from the lens controller 12 so as to operate the diaphragm unit.

Numerical reference 17 denotes a DC/DC converter as a booster circuit, which converts the voltage (VBAT, PGND) of the in-camera power supply 18 sent from the camera 1 via the electric contacts 46C, 47C, 46L, and 47L into a voltage required for driving the focus drive motor 14 which is a vibration type motor.

Here, the lens controller 12 switches the DC/DC converter 17 into the ON state or the OFF state in response to a reception of a command of switching ON/OFF of the DC/DC converter 17 transmitted from the camera controller 3.

Next, an operation of the aforementioned camera system (operation of the camera controller 3) will be described using a flow chart shown in FIG. 3.

In step S201, a determination is made as to whether or not a main switch (not shown) provided on the camera 1 is in the ON state. When the main switch is in the ON state, the processing proceeds to step S202, and when the switch remains in the OFF state, step S201 is repeated.

In step S202, transmission of the data indicating the operation state (zoom position, focus position, diaphragm value, and the like) of the interchangeable lens 2 and the lens data (open diaphragm value, focal length, and the like) on the interchangeable lens 2 is requested to the lens controller 12, and the requested data is received from the lens controller 12.

In step S203, a confirmation is made as to whether or not the release button 21 of the camera 1 is operated in a half-pressed manner, that is whether or not the SW1 is in the ON state. When the SW1 is in the ON state, the processing proceeds to step S204, and when the SW1 is in the OFF state, the processing returns to step S201.

In step S204, transmission of the lens data (data required for photometry operation and focusing operation) on the interchangeable lens 2 is requested for the lens controller 12, and the requested data is received from the lens controller 12. In step S205, the photometry circuit 5 is driven to perform an photometry operation so that operation of an exposure value (photometry operation) is performed on the basis of this photometry result.

In addition, when it is determined on the basis of the photometry result that an environment for image-taking is darker that predetermined brightness, the camera controller 3 drives a stroboscope unit (not shown) provided in the camera 1 so as to emit a stroboscopic light during image-taking.

In step S206, a booster drive command for switching the DC/DC converter 17 into the ON state is transmitted to the lens controller 12. Thereby, the lens controller 12 drives the DC/DC converter 17 so as to boost the output voltage of the in-camera power supply 18.

In step S207, the focusing circuit 6 is driven to perform an focusing action, and operation (focusing operation) for focus adjustment is performed on the basis of the focusing result thereof. Specifically, a drive direction and a drive amount for moving the focus lens unit 2b to an in-focus position are operated on the basis of the focusing result.

In step S208, a focus drive command for driving the focus lens unit 2b according to the focusing operation result in step S207 is transmitted to the lens controller 12. In step S209, it is detected whether or not the release button 21 is operated in a full-pressed manner, that is whether or not the SW2 is in the ON state. Here, when the SW 2 is in the ON state, the processing proceeds to step S212, and when the SW2 is in the OFF state, the processing proceeds to step S210.

In step S210, it is detected whether or not the SW1 is in the ON state. Here, when the SW1 is in the OFF state, the processing proceeds to step S211, and when the SW1 is in the ON state, the processing returns to step S209.

In step S211, a boosting stop command for switching the DC/DC converter 17 into the OFF state and a focus drive stop command for stopping focus drive are transmitted to the lens controller 12 and the processing returns to step S201. In step S212, transmission of data on a drive state of the focus lens unit 2b in the interchangeable lens 2 is requested to the lens controller 12, and the requested data is received from the lens controller 12.

In step S213, a determination is made on the basis of the data on the focus drive state transmitted from the lens controller 12 as to whether or not the focus lens unit 2b is being driven in the interchangeable lens 2. When the drive of the focus lens unit 2b is terminated in the interchangeable lens 2, the processing proceeds to step S214. At this time, the focus lens in the interchangeable lens 2 is moved to a predetermined in-focus position and is stopped, and the image-taking optical system is in the in-focus state.

On the other hand, when the focus lens is being driven, the processing returns to step S212.

In step S214, a boosting stop command for switching the DC/DC converter 17 into the OFF state is transmitted to the lens controller 12. Thereby, the lens controller 12 switches the DC/DC converter 17 from the ON state to the OFF state (drive stop state).

In step S215, a diaphragm drive command for driving the diaphragm is transmitted to the lens controller 12. Thereby, the lens controller 12 drives the diaphragm drive motor 16 via the diaphragm drive circuit 15 so as to operate the diaphragm unit in the interchangeable lens 2.

In step S216, the shutter control circuit 7 is driven on the basis of an exposure value obtained in step S205 to open/close the shutter unit. Thereby, a flux of light from the subject passing through the image-taking optical system of the interchangeable lens 2 is exposed to an image-pickup element 20 or a film in the camera 1.

In step S217, a command for switching the diaphragm into an open state is transmitted to the lens controller 12. Thereby, the lens controller 12 drives the diaphragm drive motor 16 via the diaphragm drive circuit 15 so as to switch the diaphragm unit into the open state.

In step S218, a predetermined processing is applied to an output signal from the image-pickup element 20 so that image data is generated to be recorded in a recording medium (semiconductor memory, optical disk, or the like) (not shown).

Next, in step S219, a determination is made as to whether or not the capacity for further recording the image data in the recording medium remains. When the capacity remains, the processing returns to step S201, and when the capacity is insufficient, the processing proceeds to step S220. In step S220, the fact that the storage capacity is insufficient is displayed on a display panel (not shown).

In addition, when the present camera 1 is a film camera, the film feeding circuit 8 is driven in step S218 so that the film in the camera 1 is winded up by one frame. Next, in step S219, a determination is made as to whether or not an unexposed image-taking frame remains in the film. When the unexposed image-taking frame remains, the processing returns to step S201, and when the unexposed image-taking frame does not remain, the processing proceeds to step S220. In step S220, the film feeding circuit 8 is driven so as to perform a rewinding operation of the film.

Next, a focusing operation during image-taking in the camera system according to the present embodiment will be described using FIG. 4(B).

Figure 3:
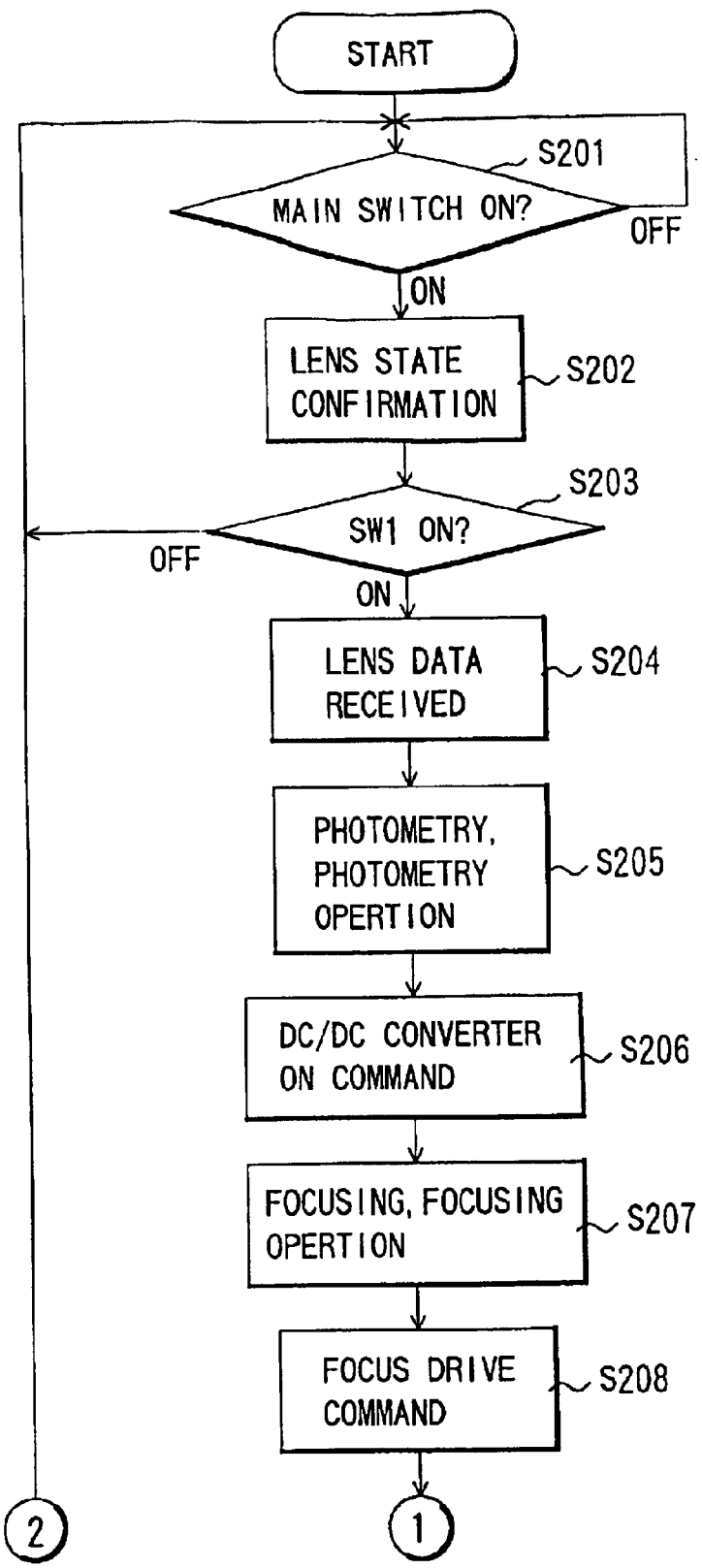
FIG. 3 is a diagram showing a flow chart of an image-taking operation in the camera system according to the embodiment.
Figure 3:
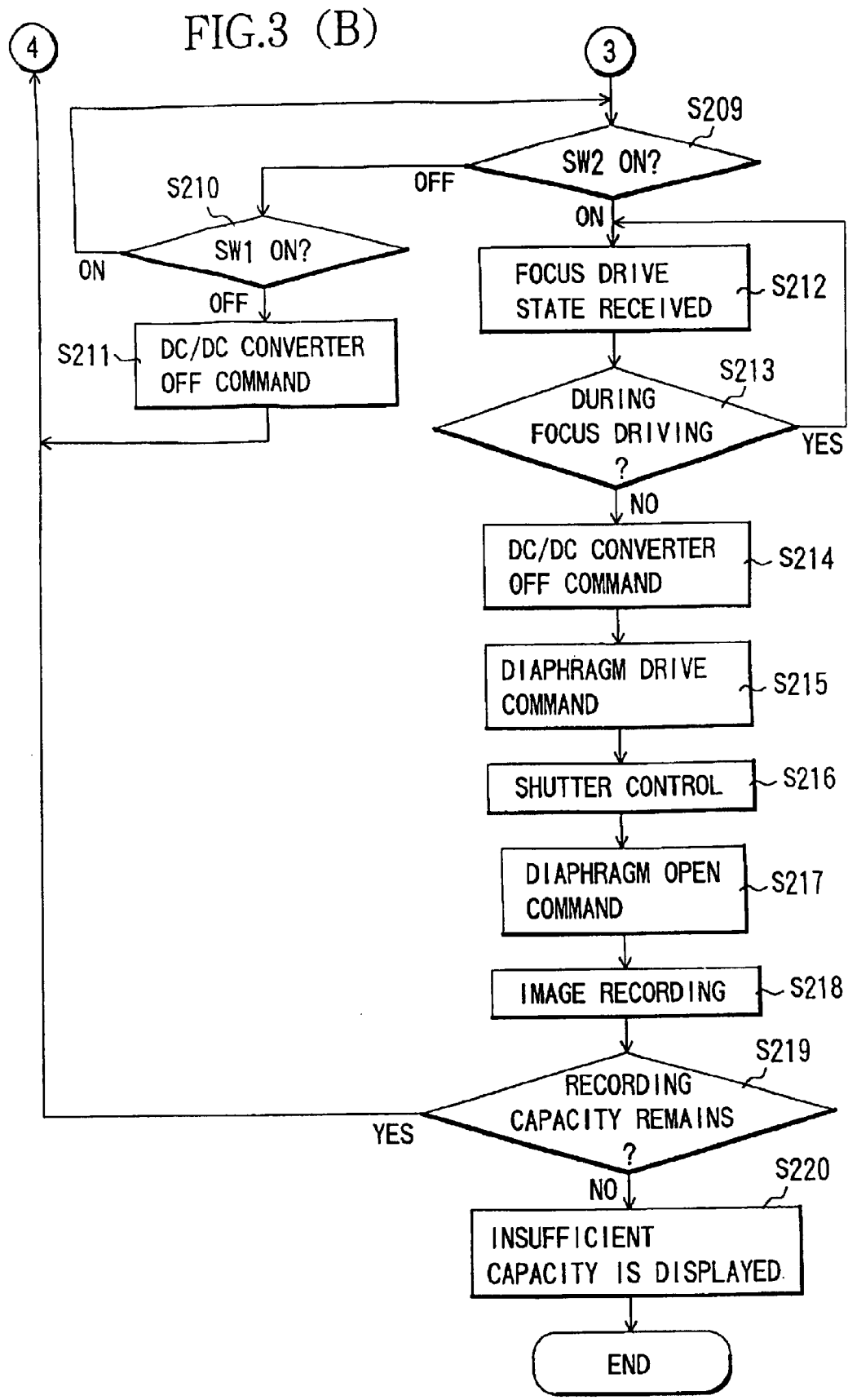

In step S206 in FIG. 3, the lens controller 12 which has received a command ("DC/DCON command" (booster drive command)") for switching the DC/DC converter 17 into the ON states from the camera controller 3 switches the DC/DC converter 17 into the ON state. Thereby, the output voltage of the DC/DC converter 17 takes a predetermined time to be made to a predetermined voltage VDRV required for driving the focus drive motor 14.

Here, the focusing action and the focusing operation are performed in step S207 in FIG. 3 until the output voltage of the DC/DC converter 17 is boosted to the predetermined voltage VDRV.

In step S208 in FIG. 3, the lens controller 12 which has received a focus drive command from the camera controller 3 performs focusing by driving the focus drive motor 14 via the focus drive circuit 13. Since the output voltage of the DC/DC converter 17 has been boosted near the predetermined voltage VDRV at a point of time when the focus drive command has been received, the drive of the focus drive motor 14 can be started without delay or within a remarkably short time (a shorter time than a standby time indicated in FIG. 4(A)) after receiving the focus drive command.

In step S211 or step S213, the lens controller 12 which has received a command of switching the DC/DC converter 17 into the OFF state ("DC/DCOFF command") switches the DC/DC converter 17 into the OFF state.

According to the present embodiment, when the vibration type motor is used as the drive source of the focus lens, a command of driving the DC/DC converter 17 (step S206) is transmitted in advance before executing the focus drive command (step S208) so as to switch the DC/DC converter 17 into the ON state. Then, the focusing action/focusing operation (step S207) is performed after the DC/DC converter drive command (step S206) is transmitted to the interchangeable lens 2 until the focus drive command (step S208) is transmitted.

Figure 4:
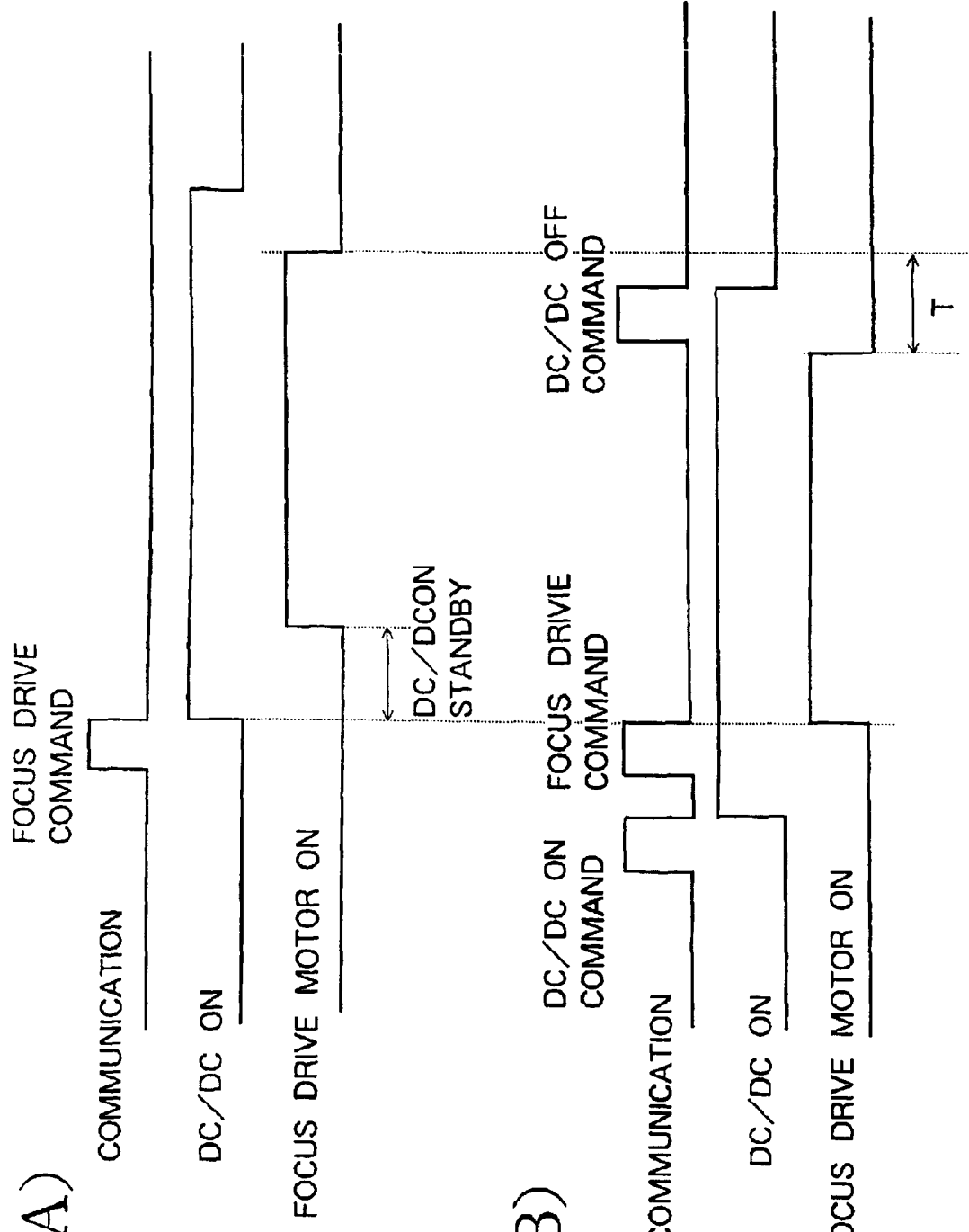
FIG. 4(A) is a diagram showing a timing chart of focus drive in a conventional camera system.
FIG. 4(B) is a diagram showing a timing chart of focus drive in the camera system according to the embodiment.

Thereby, like conventionally (refer to FIG. 4(A)), as compared with a case where the DC/DC converter is driven in response to a reception of the focus drive command, it is possible to reduce a time until the output voltage of the DC/DC converter is boosted to the predetermined voltage level. In other words, it is possible to reduce a time until the focus lens unit 2b is moved to the in-focus position by "T" in FIG. 4(B).

On the other hand, lens identification data including data on the switching control of the ON/OFF state of the DC/DC converter 17 is stored in the lens controller 12 of the interchangeable lens 2 and the camera controller 3 receives the lens identification data through communication with the lens controller 12 so that a determination is made as to whether or not the switching between the ON/OFF states of the DC/DC converter 17 can be performed in the interchangeable lens 2.

Thereby, for example, there is configured so that, when an interchangeable lens without a DC/DC converter is provided in the camera 1, an ON/OFF command of the DC/DC converter is not transmitted on the basis of the lens identification data, thereby preventing unnecessary communication.

Further, there is configured so that the camera controller 3 detects the ON/OFF state of the DC/DC converter 17 in the interchangeable lens 2 through the communication with the lens controller 12, so that a determination can be made as to whether or not the interchangeable lens 2 is normally operated in response to a command from the camera controller 3, that is whether or not the switching between the ON/OFF states of the DC/DC converter 17 is normally operated.

When the interchangeable lens 2 is not normally operated in response to a command from the camera controller 3, the contents indicating this fact are displayed on the display panel of the camera 1 so as to alarm the camera operator or to reset the camera operation. Thereby, it is possible to prevent a malfunction in the interchangeable lens 2.

According to the present embodiment, the DC/DC converter ON command (step S206) is transmitted to the lens controller 12 at a timing before the focusing action and the focusing operation in step S207 are performed, but it may be transmitted at any timing before the focus drive command in step S208 is transmitted.

For example, the DC/DC converter ON command (step S206) may be transmitted when detecting that the SW1 is ON in the step S203, and it may be transmitted also when receiving the lens data in the step S204.

Particularly, with respect to the timing when the focus drive command is transmitted in step S208, the DC/DC converter ON command is transmitted within a shorter time than a time required from the drive start of the DC/DC converter 17 until the output voltage of the DC/DC converter 17 reaches the predetermined voltage level, so that the focus lens unit 2b can be driven in synchronization with the focus drive command with hardly having the standby time.

Further, according to the present embodiment, the lens controller 12 which has received the DC/DC converter OFF command (step S214) from the camera controller 3 switches the DC/DC converter 17 into the OFF state, but the DC/DC converter 17 may be switched into the OFF state by the lens controller 12 when the drive of the focus lens unit 2b is terminated.

Further, according to the present embodiment, an example using the vibration type motor for focus drive is shown, but any motor can be used if the motor is directed for driving using a voltage converted from a voltage supplied from the camera 1 by the DC/DC converter 17.

Furthermore, according to the present embodiment, the camera system configured with the interchangeable lens 2 and the camera 1 is described, but the present invention is not limited thereto. In other words, the present invention can be applied to a camera system where the interchangeable lens 2 and the camera 1 according to the present embodiment are integrated.

As described above, according to the present embodiment, the lens drive command and the booster drive command are transmitted to the lens controller, respectively, to individually drive the actuator and the booster circuit, so that the booster circuit can be driven in advance in response to the transmission of the booster drive command before driving the actuator in response to the transmission of the lens drive command.

When the booster circuit is driven in advance before driving the actuator in this manner, it is not necessary to wait for the drive of the actuator until the boosting operation of the booster circuit is completed, thereby reducing the time until the actuator is driven as compared with a case where the booster circuit is driven after a lens drive command has been received, unlike conventionally.

A time until the actuator is driven is reduced so that the lens unit can be moved to a predetermined position in a short time, thereby realizing a user-friendly camera system.

While preferred embodiments have been described, it is to be understood that modification an variation of the present invention may be made without departing from the scope of the following claims.

What is claimed is:

1. A camera having a photometry function, on which a lens apparatus is attachable, the lens apparatus having a booster circuit which boosts a supply voltage, an actuator which receives a voltage supply from the booster circuit so as to drive a lens unit, and a lens controller which controls the drive of the booster circuit and the actuator, the camera comprising:

a communication unit which communicates with the lens controller; and a camera controller which transmits a lens drive command for driving the actuator to the lens controller via the communication unit, wherein the camera controller also transmits a booster drive command for driving the booster circuit to the lens controller before transmitting the lens drive command after a photometry operation.

2. The camera according to claim 1, wherein the camera controller transmits the booster drive command at a time before a predetermined time prior to a transmission timing of the lens drive command, wherein the predetermined time is at a minimum time required for an output voltage of the booster circuit to reach a predetermined voltage from the drive start of the booster circuit.

3. The camera according to claim 1, further comprising:

an operation member which is operated in order to start an image-taking preparation operation, wherein the camera controller transmits the booster drive command according to an operation of the operation member.

4. The camera according to claim 1, wherein the camera controller determines whether the drive control of the actuator has been terminated or not through communication with the lens controller, and transmits a drive stop signal for stopping the drive of the booster circuit to the lens controller when the drive operation of the actuator has been terminated.

5. The camera according to claim 1, wherein the camera controller determines whether the drive control of the booster circuit is enabled or not on the basis of a result of communication with the lens controller via the communication unit, transmits the booster drive command to the lens controller when it is determined that the drive control of the booster circuit is enabled, and limits the transmission of the booster drive command when it is determined that the drive control of the booster circuit is disabled.

6. A lens apparatus which is attachable to a camera having a photometry function, and which is communicable with the camera, the lens apparatus comprising:

a booster circuit which boosts a supply voltage;

an actuator which receives a voltage supply from the booster circuit so as to drive a lens unit; and a lens controller which controls the drive of the booster circuit and the actuator, wherein the lens controller drives the booster circuit in response to a reception of a booster drive command for driving the booster circuit from the camera, and drives the actuator in response to a reception of a lens drive command for driving the actuator from the camera, and wherein the lens controller receives the booster drive command before receiving the lens drive command after a photometry operation of the camera.

7. The lens apparatus according to claim 6, wherein the lens controller drives the booster circuit in response to a reception of the booster drive command at a time before a predetermined time prior to a transmission timing of the lens drive command, wherein the predetermined time is at a minimum time required for an output voltage of the booster circuit to reach a predetermined voltage form the drive start of the booster circuit.

8. The lens apparatus according to claim 6, wherein the lens controller stops the drive of the booster circuit in response to a reception of a drive stop command for stopping the drive of the booster circuit from the camera when the drive of the actuator is terminated.

9. A camera system, comprising:

a lens apparatus having a booster circuit which boosts a supply voltage, an actuator which receives a voltage supply from the booster circuit so as to drive a lens unit, and a lens controller which controls the drive of the booster circuit and the actuator; and a camera having a photometry function, a communication unit which communicates with the lens controller and a camera controller which transmits a lens drive command for driving the actuator to the lens controller via the communication unit, wherein the camera controller also transmits a booster drive command for drive the booster circuit to the lens controller before transmitting the lens drive command after a photometry operation, and the lens controller drives the booster circuit in response to a reception of the booster drive command, and drives the actuator in response to a reception of the lens drive command.

10. The camera system according to claim 9, wherein the camera controller transmits the booster drive command at a time before a predetermined time prior to a transmission timing of the lens drive command, wherein the predetermined time is at a minimum time required for an output voltage of the booster circuit to reach a predetermined voltage from the drive start of the booster circuit.

11. The camera system according to claim 9, wherein the camera has an operation member which is operated in order to start an image-taking preparation operation, and the camera controller transmits the booster drive command according to an operation of the operation member.

12. The camera system according to claim 9, wherein the camera controller determines whether the drive control of the actuator has been terminated or not through communication with the lens controller, and transmits a drive stop signal for stopping the drive of the booster circuit to the lens controller when the drive operation of the actuator has been terminated, and the lens controller stops the drive of the booster circuit in response to a reception of the drive stop command.

13. The camera system according to claim 9, wherein the camera controller determines whether the drive control of the booster circuit is enabled or not on the basis of a result of communication with the lens controller via the communication unit transmits the booster drive command to the lens controller when the drive control of the booster circuit is enabled, and limits the transmission of the booster drive command when the drive control of the booster circuit is disabled.

* * * * *